(12) United States Patent
Fujimoto

(10) Patent No.: US 10,775,849 B2
(45) Date of Patent: Sep. 15, 2020

(54) FLEXIBLE DEVICE AND METHOD FOR MANUFACTURING SAME

(71) Applicant: Sharp Kabushiki Kaisha, Sakai, Osaka (JP)

(72) Inventor: Hidetoshi Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/333,608

(22) PCT Filed: Sep. 20, 2016

(86) PCT No.: PCT/JP2016/077740
§ 371 (c)(1),
(2) Date: Mar. 15, 2019

(87) PCT Pub. No.: WO2018/055679
PCT Pub. Date: Mar. 29, 2018

(65) Prior Publication Data
US 2019/0212781 A1   Jul. 11, 2019

(51) Int. Cl.
| | | |
|---|---|---|
| G09G 1/00 | (2006.01) | |
| G06F 1/16 | (2006.01) | |
| G06F 3/041 | (2006.01) | |
| G09F 9/30 | (2006.01) | |
| H04M 1/02 | (2006.01) | |

(52) U.S. Cl.
CPC .......... *G06F 1/1652* (2013.01); *G06F 1/1641* (2013.01); *G06F 1/1643* (2013.01); *G06F 3/0412* (2013.01); *G06F 1/1681* (2013.01); *G06F 2203/04102* (2013.01); *G09F 9/301* (2013.01); *H04M 1/0216* (2013.01); *H04M 1/0247* (2013.01); *H04M 1/0268* (2013.01); *H04M 2250/16* (2013.01)

(58) Field of Classification Search
CPC .. G06F 1/16; G06F 3/03; G06F 3/041; G09G 3/32; H05K 7/02; H01L 27/32
See application file for complete search history.

(56) References Cited

U.S. PATENT DOCUMENTS

| | | |
|---|---|---|
| 2008/0241456 A1 | 10/2008 | Kunthady et al. |
| 2014/0183473 A1* | 7/2014 | Lee ..................... H01L 27/3244 257/40 |
| 2015/0009128 A1 | 1/2015 | Matsumoto |

(Continued)

FOREIGN PATENT DOCUMENTS

| | | |
|---|---|---|
| JP | 60-155498 A | 8/1985 |
| JP | 2004-290251 A | 10/2004 |

(Continued)

OTHER PUBLICATIONS

Official Communication issued in International Patent Application No. PCT/JP2016/077740, dated Nov. 29, 2016.

*Primary Examiner* — Michael A Faragalla
(74) *Attorney, Agent, or Firm* — Keating & Bennett, LLP

(57) ABSTRACT

A flexible device includes a display portion including a flexible display and a support body. The support body includes at least one curved portion that includes a surface opposite from a laid surface of the flexible display, the surface being gently curved toward the laid surface of the flexible display, and that has an oval arc-shaped cross section. The flexible display is laid across the curved portion.

12 Claims, 13 Drawing Sheets

(56) References Cited

U.S. PATENT DOCUMENTS

| | | | |
|---|---|---|---|
| 2015/0227248 A1* | 8/2015 | Yamazaki | G06F 1/1615 345/173 |
| 2015/0255522 A1* | 9/2015 | Sato | H01L 51/0097 257/88 |

FOREIGN PATENT DOCUMENTS

| | | | |
|---|---|---|---|
| JP | 2006-287982 A | 10/2006 | |
| JP | 2008-254209 A | 10/2008 | |
| JP | 2010-256660 A | 11/2010 | |
| JP | 2011-004378 A | 1/2011 | |
| JP | 2015-028617 A | 2/2015 | |
| JP | 2015-166865 A | 9/2015 | |
| JP | 2015-169711 A | 9/2015 | |
| JP | 2015-189240 A | 11/2015 | |
| WO | 2014/087951 A1 | 6/2014 | |

\* cited by examiner

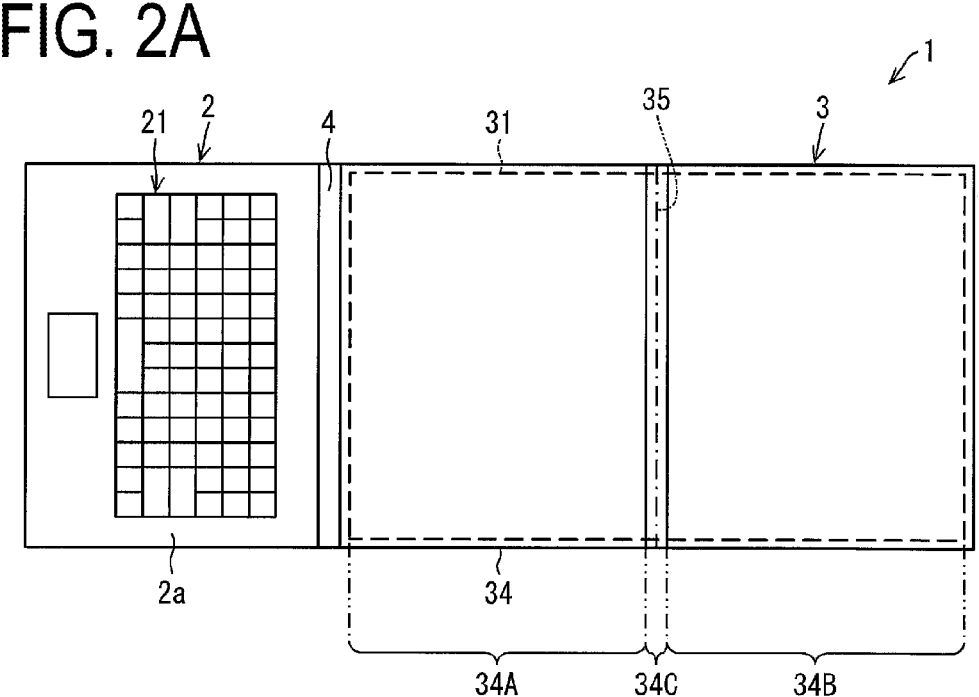
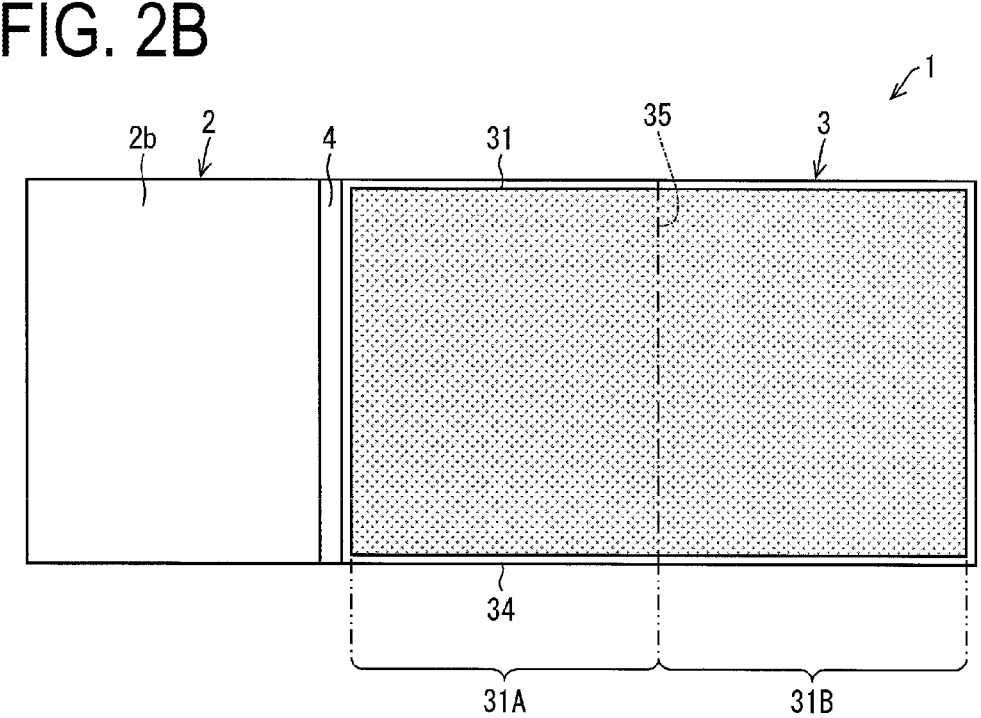

FLEXIBLE DEVICE AND METHOD FOR MANUFACTURING SAME

TECHNICAL FIELD

The disclosure relates to a flexible device including a flexible display and a manufacturing method for the flexible device.

BACKGROUND ART

In recent years, there is a demand for the downsizing of electronic devices such as notebook type personal computers, mobile phones, or mobile information terminals for the purpose of improvement of portability, as such devices have been made mobile. On the other hand, it is desirable that a display portion and an operation unit be large due to an expansion of the amount of information and for the purpose of improvement in viewability and operability.

Therefore, in recent years, a folding type flexible device including a bendable flexible display has been developed as such an electronic device (for example, see PTL 1).

PTL 1 discloses, as a folding type flexible device including a bendable flexible display, a mobile communication terminal including: an electronic circuit housing; a flexible display; a plurality of planer support housings that support the flexible display; a hinge portion as a first connection unit for connecting the electronic circuit housing and the support housings in a bendable manner; and a hinge portion as a second connection unit for connecting the plurality of support housings in a bendable manner.

PTL 1 discloses that a plastic hinge portion having a hollow inside and a bellows shape in a cross section in both side surfaces is used as the hinge portion as the second connection unit, and the support housings connected by the hinge portion are bent with the electronic circuit housing between plane surfaces of the support housings so that the flexible display can be bent at a gentle bending angle.

CITATION LIST

Patent Literature

PTL 1: JP 2006-287982 A (published on Oct. 19, 2006)
PTL 2: JP 2004-290251 A (published on Oct. 21, 2004)

SUMMARY

Technical Problem

However, the hinge portion disclosed in PTL 1 has a complicated structure, and has a problem that the flexible display can be bent only in a direction in which the bellows on the side not contacting with the flexible display extend.

On the other hand, PTL 2 discloses a board-shaped structure that can be freely bent or deployed and can be used versatilely as a component of a mobile device such as a board, a panel, a file, a bag, or a notebook type personal computer.

PTL 2 has an object to provide a board-shaped structure in which folding and deployment are easily performed, a large projecting portion or recessed portion is not generated in a deployed state, a large and flat planer surface can be provided in an inner surface side, and a covering sheet material in adjacent edge portions of adjacent core material portions is not bent in an unnatural state in the deployed state or the folded state, the board-shaped structure being hard to damage, having a simple configuration, being suitable for mass production, and being low in cost.

The board-shaped structure disclosed in PTL 2 includes a plurality of rectangular core material portions, and includes: a board body in which the plurality of core material portions are arranged such that, for example, a predetermined gap is provided between the adjacent core material portions; and a covering sheet material bonded with an adhesive to cover at least a part or all of an outer surface of this board body.

In the board-shaped structure, the covering sheet material on the outer surface side located in the adjacent edge portions of the adjacent core materials serves as a hinge, so that the board-shaped structure is formed to be freely foldable to the inner surface side.

The board-shaped structure includes a pair of inclined faces that are inclined so that the thickness becomes thinner toward the adjacent edge side, the covering sheet material includes an outer surface covering portion bonded to the outer surface of the board body, an inclined face covering portion bonded across the pair of inclined faces is formed in the outer surface covering portion, and a hinge portion is formed in the center portion of the inclined face covering portion.

It is considered that, when the board-shaped structure disclosed in PTL 2 is used as a support body that supports a flexible display, a flexible device that has a simple configuration, is suitable for mass production, and is low in cost, can be obtained.

However, the board-shaped structure disclosed in PTL 2 is formed to be foldable to the inner surface side with the covering sheet material as the outer surface side, and is not formed to be foldable to the outer surface side.

In addition, a flexible display has a problem that, when a load is concentrated on a bent portion, a crease is generated in the bent portion, or the bent portion is ripped, which damages the flexible display.

The board-shaped structure disclosed in PTL 2 has a large variation in the thickness of the adjacent edge portion in the outer surface of the core material portion, and the core material portion includes a corner portion. Therefore, even when a gap between adjacent core material portions is adjusted so that the board-shaped structure can be folded to the outer surface side, in a case where the board-shaped structure is used as a support body for supporting the flexible display, the flexible display may be damaged, for example, a crease may be generated in a bent portion of the flexible display.

The disclosure has been made in view of the problem described above, and has an object to provide a flexible device that has a simple configuration capable of reducing a load in a bent portion and preventing a flexible device from being damaged, and a manufacturing method for the flexible device.

Solution to Problem

In order to solve the problem described above, a flexible device according to an aspect of the disclosure includes a display portion including a flexible display and a support body in which the flexible display is laid. The support body includes at least one curved portion that includes a surface opposite from a laid surface of the flexible display, the surface being gently curved toward the laid surface of the flexible display, and that has an oval arc-shaped cross section. The flexible display is laid across the curve.

In order to solve the problem described above, a manufacturing method for a flexible device according to an aspect of the disclosure is a manufacturing method for a flexible device including a display portion including a flexible display and a support body in which the flexible display is laid, the method including forming the support body including at least one curved portion that includes a surface opposite from a laid surface of the flexible display, the surface being gently curved toward the laid surface of the flexible display, and that has an oval arc-shaped cross section, and laying the flexible display across the curve in the laid surface of the flexible display in the support body.

Advantageous Effects of Disclosure

According to an aspect of the disclosure, a flexible device that has a simple configuration capable of reducing a load in the curved portion used as a bent portion and preventing a flexible device from being damaged, and a manufacturing method for the flexible device, can be provided.

BRIEF DESCRIPTION OF DRAWINGS

FIG. 2A is a plan view illustrating a schematic configuration of the flexible device according to the first embodiment of the disclosure viewed from a side of the support body of the display portion in a state where the flexible device is deployed by 180°, and FIG. 2B is a plan view illustrating a schematic configuration of the flexible device according to the first embodiment of the disclosure viewed from a side of the flexible display of the display portion in a state where the flexible device is deployed by 180°.

DESCRIPTION OF EMBODIMENTS

A detailed description follows regarding embodiments of the disclosure.

First Embodiment

A description follows regarding an embodiment of the disclosure, on the basis of FIGS. 1A and 1B to FIGS. 11A and 11B.

Schematic Configuration of Flexible Display

Hereinafter, the present embodiment will be described while exemplifying a case in which a flexible device (electronic device) according to the present embodiment is an information processing device such as a personal computer including a main body portion including a key input operation unit.

Figure 1A:
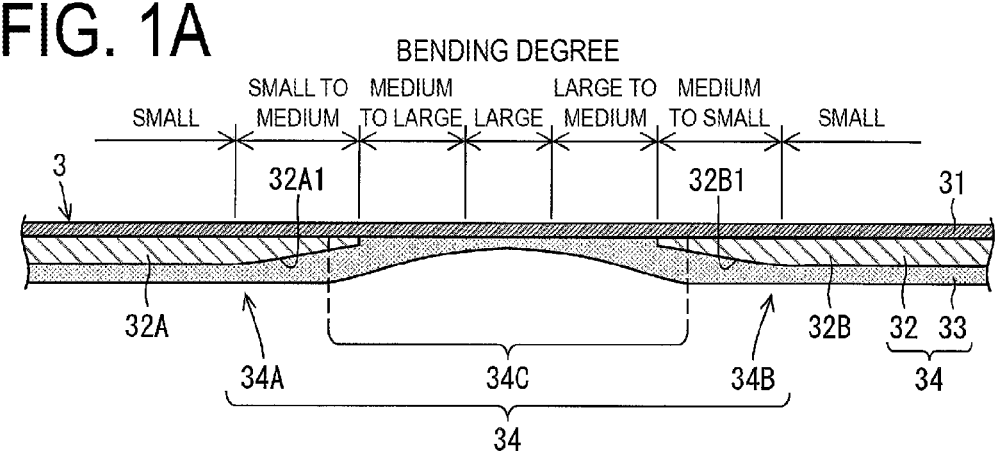
FIG. 1A is a cross-sectional view illustrating a shape of a curved portion of a support body in a flexible device according to a first embodiment of the disclosure.
Figure 1B:
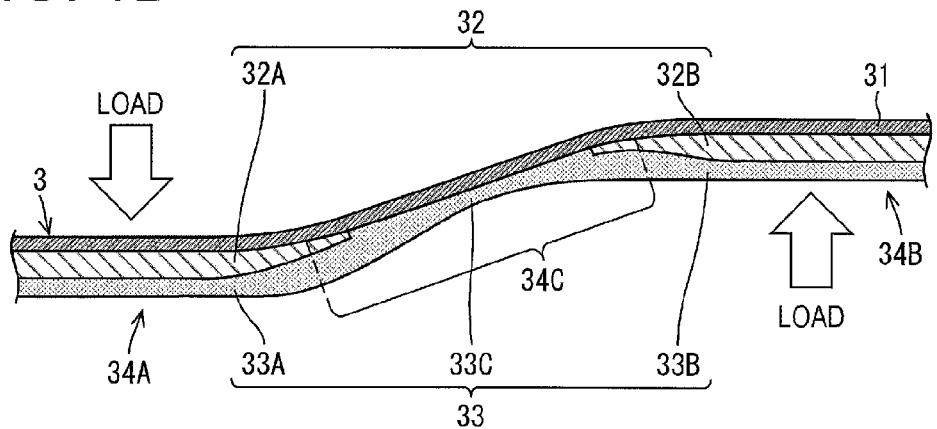
FIG. 1B is a cross-sectional view showing a state where a load is applied to the curved portion illustrated in FIG. 1A.

FIG. 1A is a cross-sectional view illustrating a shape of a curved portion 34C of a support body 34 in a flexible device 1 according to the present embodiment, and FIG. 1B is a cross-sectional view showing a state where a load is applied to the curved portion 3 illustrated in FIG. 1A. FIG. 2A is a plan view illustrating a schematic configuration of the flexible device 1 according to the present embodiment viewed from a side of the support body 34 of the display portion 3 in a state where the flexible device 1 is deployed by 180°, and FIG. 2B is a plan view illustrating a schematic configuration of the flexible device 1 according to the present embodiment viewed from a side of the flexible display 31 of the display portion 3 in a state where the flexible device 1 is deployed by 180°. Here, the "deployed state by 180°" refers to a so-called full-flat state in which the flexible display 1 is made to be flat by being opened.

Figure 3:
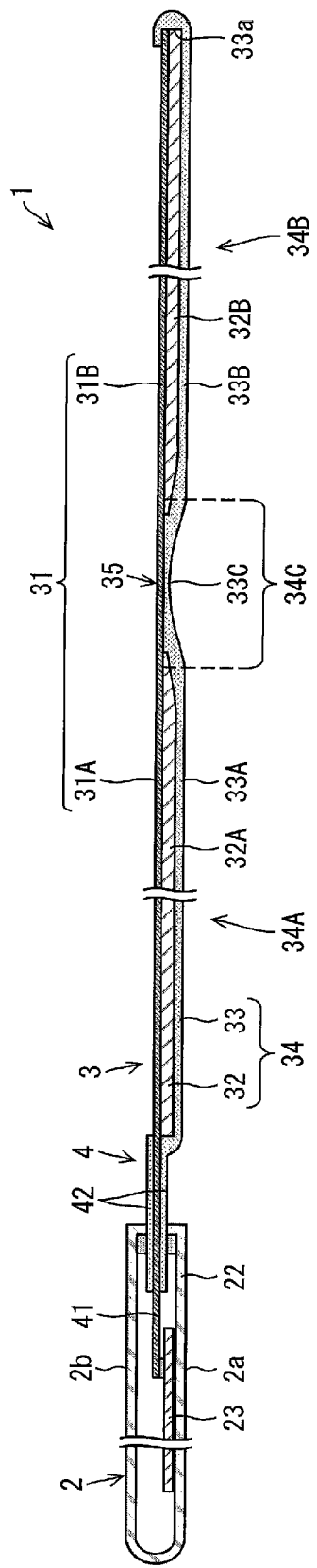
FIG. 3 is a partially broken cross-sectional view illustrating main portions of the flexible device according to the first embodiment of the disclosure in a state where the flexible device is deployed by 180°.
Figure 4A:
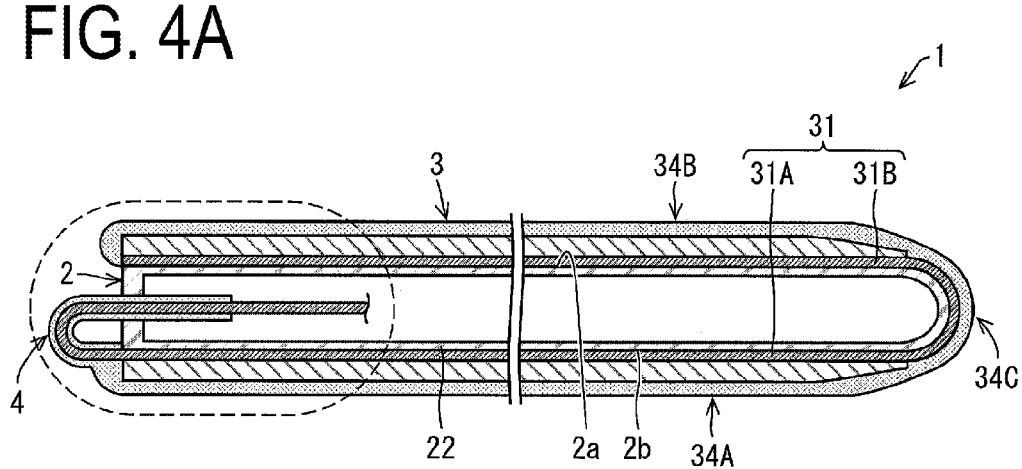
FIG. 4A is a partially broken cross-sectional view illustrating a schematic configuration of the flexible device according to the first embodiment of the disclosure in a state where the flexible device is folded with the flexible display being inside and the display portion wound around a main body.
Figure 4B:
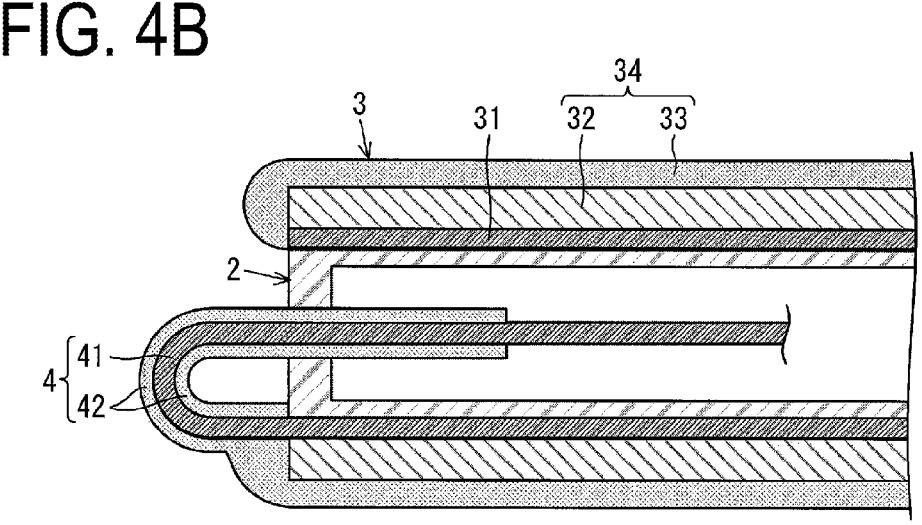
FIG. 4B is a portion surrounded by a frame in FIG. 4A and is a cross-sectional view illustrating a schematic configuration of the flexible device in the vicinity of a connection section.

FIG. 3 is a partially broken cross-sectional view illustrating main portions of the flexible device 1 according to the present embodiment in a state where the flexible device 1 is deployed by 180°. FIG. 4A is a partially broken cross-sectional view illustrating a schematic configuration of the flexible device 1 in a state where the flexible device 1 is folded with the flexible display 31 being inside and the display portion 3 wound around a main body portion 2, and FIG. 4B is a portion surrounded by a frame in FIG. 4A and is a cross-sectional view illustrating a schematic configuration of the flexible device 1 in the vicinity of a connection section 4.

The flexible device 1 according to the present embodiment includes the flexible display 31, and is a folding type flexible electronic device that can be freely folded (bent) and deployed (expanded). For the flexible device 1, either a folded state (in other words, closed state) in which the flexible device 1 is folded, or a deployed state (in other words, opened state) in which the flexible device 1 is not folded can be selected.

As illustrated in FIGS. 1A and 1B to FIGS. 4A and 4B, the flexible device 1 according to the present embodiment includes the main portion 2 having a plate shape, the display portion 3, and the connection section 4 that connects the main body portion 2 and the display portion 3.

The main body portion 2 according to the present embodiment is an information input device in which an information input surface 2a including an information input portion 21 such as a key input operation portion such as a key board, or a pad portion is provided in a housing 22 such that the information input surface 2a faces the outside. The housing 22 is a hollow rigid body and rectangle in a plan view.

Various electronic components such as a mounting substrate 23 including a central processing unit (CPU), various memories, or the like, a wireless communication portion, a television reception portion, an antenna, a battery (secondary battery), or an internal speaker are provided in the inside of the housing 22 in the main body portion 2, while others than the mounting substrate 23 are not illustrated.

Although not illustrated, a section such as a universal serial bus (USB, registered trade mark) terminal section, an audio output terminal section, or a power source cord connection terminal section may be provided in, for example, a side surface of the housing 22 in the main body portion 2.

The display portion 3 includes the flexible display 31, and the support body 34 (housing) for supporting the flexible display 31 in which the flexible display 31 is laid. The support body 34 includes a core material 32, and a covering member 33 that covers the core material 32.

The flexible display 31 is, for example, integrated with the support body 34. The covering member 33 is an exterior body, and the core material 32 is provided in a part between the flexible display 31 and the covering member 33.

For example, a recessed portion 33a (for example, see FIG. 3) that is used for laying the core material 32 and the flexible display 31, and covers at least an end face of the core material 32 may be formed in mounting surfaces of the core material 32 and the flexible display 31 in the covering member 33. For example, as illustrated in FIG. 3, a side wall upper end portion of the recessed portion 33a may be folded back to a part (specifically, onto a frame edge region as a non-display region) of an upper portion side (in other words, a display surface side) of the flexible display 31. As a result, the covering member 33 may support (hold) the core material 32 and the flexible display 31 so as to sandwich peripheral edge portions of the core material 32 and the flexible display 31.

As illustrated in FIGS. 2A and 2B and FIG. 3, the display portion 3 is connected to the main body portion 2 in the connection section 4 such that the covering member 33 is located at the side of the information input surface 2a of the main body portion 2 in a state where the flexible device 1 is deployed by 180 degrees so that the display portion 3 and the main body portion 2 are in the full-flat state, and such that the flexible display 31 is located at the side of the opposite surface (hereinafter, referred to as "rear surface" for convenience of description) from the information input surface 2a of the main body portion 2. In other words, the main body portion 2 and the display portion 3 are connected such that the information input surface 2a of the main body portion 2 and the flexible display 31 face opposite directions from each other in a state where the flexible device 1 is deployed by 180 degrees.

Although not illustrated, the flexible display 31 has a configuration in which an electro-optical element is sandwiched by a resin film, together with a drive circuit for driving the electro-optical element.

The flexible display 31 is not limited particularly and may be any bendable display panel having flexibility, and examples of the flexible display 31 include an organic electroluminescence (EL) display provided with the Organic Light Emitting Diode (OLED) as the electro-optical element, an inorganic EL display provided with an inorganic light emitting diode as the electro-optical element, a Quantum dot Light Emitting Diode (QLED) display provided with a QLED as the electro-optical element, a liquid crystal display provided with a liquid crystal display element as the electro-optical element, and an electronic paper provided with an electrophoretic element as the electro-optical element.

The flexible display 31 may include a touch panel function that enables input operation by contact of a dedicated electronic pen, a finger of a user, or the like.

As illustrated in FIGS. 1A and 1B and FIG. 3, the support body 34 includes, as a bendable bent portion, a curved portion 34C that includes a surface opposite from a laid surface (in other words, a surface on a side of the covering member 33) of the flexible display 31, the surface gently curved toward the laid surface of the flexible display 31 along a direction parallel with the connection section, and that has an oval arc-shaped cross section (cross section is an oval arc-shaped recessed portion).

In other words, the support body 34 includes the curved portion 34C including the surface opposite from the laid surface of the flexible display 31, the surface being a semi-oval cylindrical curved shape, and the curved portion 34C is formed to be a tapered shape having a curved surface inclined so as to be thinner toward a center axis 35 (bending center, in other words, a bending axis of the bent portion) as a curving axis of the curved portion 34C.

For example, as illustrated in FIGS. 2A and 2B and FIG. 4A, the curved portion 34C is provided to be parallel with a short-hand direction (direction parallel with the connection section 4) orthogonal to a longitudinal direction in the center portion of the longitudinal direction such that the longitudinal direction of the support body 34 is divided into two.

Hereinafter, for convenience of description, a region located on the connection section 4 side with the curved portion 34C therebetween in the support body 34 is referred to as a first support portion 34A, and a region located on the opposite side from the first support portion 34A with the curved portion 34C therebetween is referred to as a second support portion 34B.

The curved portion 34C has a curved surface only in the surface opposite from the laid surface of the flexible display 31 that is one surface (one main surface) of the support body 34, and the surfaces on the laid surface side of the flexible display 31 are formed to be flush with each other in a deployed state of the flexible device 1.

The flexible display 31 is laid on the support body 34 across the curved portion 34C so as to be across the first support portion 34A and the second support portion 34B.

Hereinafter, for convenience of description, a region located closer to the connection section 4 from the center axis 35 with the center axis 35 of the curved portion 34C as a boundary in the flexible display 31 in a plan view is referred to as a first display portion 31A, and a region located on the opposite side from the first display portion 31A with the center axis 35 therebetween (in other words, a region located on the opposite side from the connection section 4) is referred to as a second display portion 31B.

As illustrated in FIGS. 1A and 1B, and FIG. 3, the core material 32 has a structure partitioned along the center axis 35 by removing around the center axis 35 the core material 32 having the center axis 35. As a result, the core material 32 includes a first core portion 32A and a second core portion 32B separated from each other with the center axis 35 therebetween. Each end portion on the opposite surface sides of the first core portion 32A and the second core portion 32B is located at a position separated from the center axis 35.

The first core portion 32A and the second core portion 32B include inclined surfaces 32A1 and 32B1 in which at least each facing side edge portion in the curved portion 34C is inclined to the laid surface of the flexible display 31 and which are formed thinner toward the center axis 35.

The covering member 33 is formed to be across the first core portion 32A and the second core portion 32B so as to contact the core material 32 including the first core portion 32A and the second core portion 32B, and the flexible display 31 not covered with the core material 32.

In other words, the covering member 33 contacts with the first core portion 32A in the first support portion 34A, contacts with the second core portion 32B in the second support portion 34B, and contacts with a rear surface (in other words, a surface opposite from a display surface) of the flexible display 31 in the curved portion 34C.

Hereinafter, for convenience of description, as illustrated in FIG. 1B, a portion that covers the first core portion 32A and is located on the connection section 4 side with the curved portion 34C therebetween is referred to as a first covering portion 33A, a portion that covers the second core portion 32B and is located on the position opposite from the first covering portion 33A in a plan view with the curved portion 34C therebetween is referred to as a second covering portion 33B, and a portion that directly contacts with the flexible display 31 in the curved portion 34C is referred to as a curved portion 33C (third covering portion).

In other words, the covering member 33 is provided with the curved portion 33C that includes a surface on a side facing the outside (in other words, the surface opposite from the contact surface with the core material 32 and the flexible display 31), the surface gently curved toward the laid surface of the flexible display 31 along the center axis 35 of the curved portion 34C, and that has an oval arc cross section (cross section is an oval arc-shaped recessed portion). The curved portion 33C is included in the curved portion 34C of the support body 34.

In other words, the covering portion 33C as the third covering portion includes the curved portion 33C having the surface opposite from the flexible display 31 and the core material 32, the surface being a semi-oval cylindrical curved shape, and the curved portion 33C is formed to be a tapered shape having a curved surface inclined so as to be thinner toward the center axis 35 of the curved portion 34C of the support body 34.

The core material 32 is formed of, for example, a polycarbonate resin, an acrylonitrile butadiene styrene (ABS) resin (acrylonitrile butadiene styrene copolymer), an acrylic resin, or a carbon resin.

The covering member 33 may be formed of, for example, a soft material such as a silicon, rubber, or elastomer, a metal having flexibility such as a steel use stainless (SUS), or a plastic or the like having flexibility.

The support body 34 includes the core material 32 and the covering member 33 having the shapes described above, so that the support body 34 is hard in portions other than the curved portion 34C, and can reliably hold the flexible display 31, while the curved portion 34C has flexibility and can be configured to be bendable.

The total thickness of the core material 32 and the covering member 33 is desirably about 1 mm, but is not limited thereto. The core material 32 may have any thickness as long as the core material 32 has strength with which portions other than the curved portion 34C can be held horizontally. The covering member 33 may have any thickness as long as the covering member 33 can bend in the curved portion 34C as the bent portion. It is more desirable that the core material 32 and the covering member 33 are formed to be as thin as possible within a range of capable of acquiring each function.

As described above, the curved portion 34C of the support body 34 has an oval arc-shaped cross section gently curved toward the laid surface side of the flexible display 31. Thus, as illustrated in FIG. 1A, the bending degree (in other words, the bending degree of the curved portion 33C) becomes larger toward the center axis 35 (bending axis) of the curved portion 34C, and the bending degree becomes smaller in a direction away from the center axis 35.

Here, the bending degree of the curved portion 34C refers to the curvature of the curved portion 34C in a state where the display portion 3 is deployed by 180 degrees (in other words, a state where the curved portion 34C is bent).

The bending degree is indicated by an inverse number of a radius (curvature radius) of a circle (arc) approximating the curved surface (curved line) of the surface of the curved portion 34C in a state where the display portion 3 is deployed by 180 degrees, and as the bending degree is larger, the curvature radius is smaller.

Figure 9A:
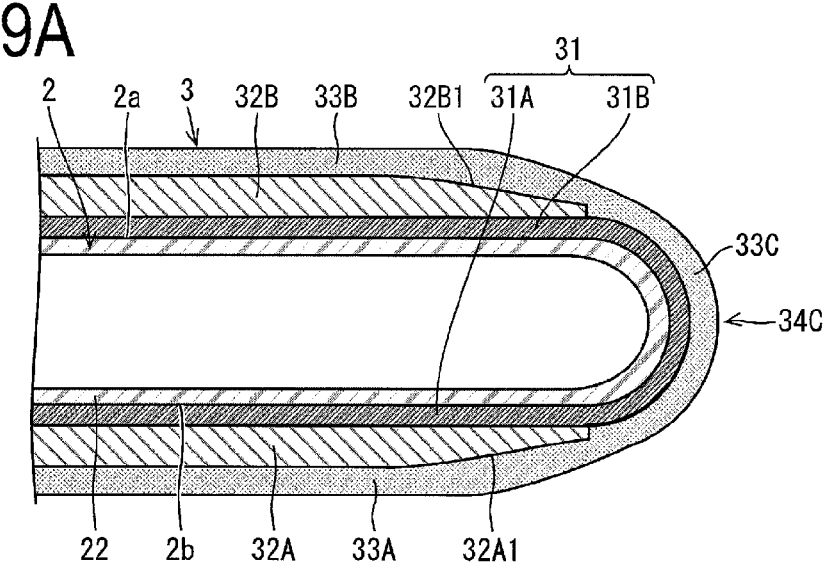
FIG. 9A is a partially broken cross-sectional view illustrating a schematic configuration of the flexible device according to the first embodiment of the disclosure in the vicinity of a curved portion in a state where the flexible device is folded with the flexible display being inside and the display portion wound around the main body.
Figure 9B:
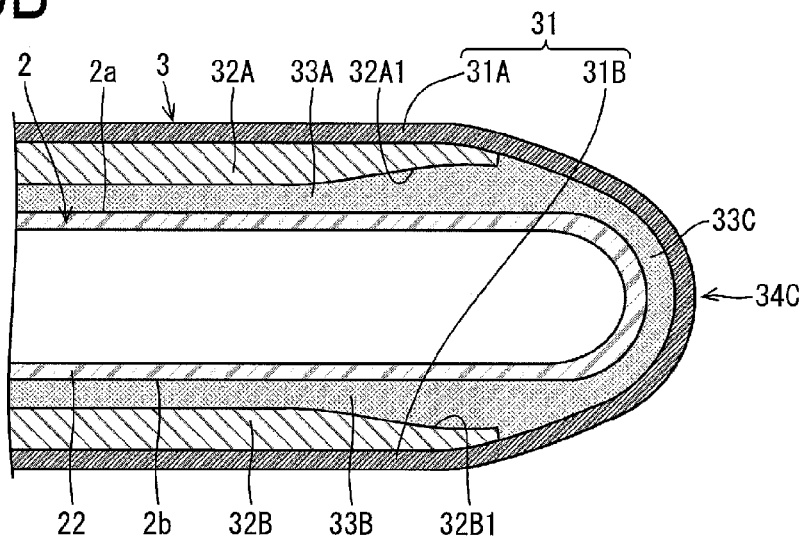
FIG. 9B is a partially broken cross-sectional view illustrating a schematic configuration of the flexible device according to the first embodiment of the disclosure in the vicinity of the curved portion in a state where the flexible device is folded with the flexible display being outside and the display portion wound around the main body.

As illustrated in FIG. 9B described later, the covering member 33 is formed to be fill a gap between the main body portion 2 and the core material 32, and the flexible display 31 in the curved portion 34C when the display portion 3 is bent so as to be wound around the main body portion 2 with the flexible display 31 as an outside.

For example, as illustrated in FIGS. 4A and 4B, the curved portion 34C is formed to be bendable along a side surface opposite from the connection section 4 in a plan view in the main body portion 2 when the display portion 3 is wound around the main body portion 2.

The bending degree (curvature) of the curved portion 34C in a state where the display portion 3 is wound around the main body portion 2 is not limited particularly. However, the flexible device 1 according to the present embodiment is an ultra-thin information processing device, and has a thickness of the main body portion 2 of, for example, 4 mm, and the curvature radius of the curved portion 34C when the display portion 3 is wound around the main body portion 2 of, for example, 2 mm. However, the specific numerical values described above are merely examples, and the present embodiment is not limited to the above descriptions.

As illustrated in FIGS. 2A and 2B and FIG. 4A, the longitudinal direction of the support body 34 has a size substantially double the size of the main body portion 2 in the longitudinal direction. Accordingly, in the flexible device 1 according to the present embodiment, the longitudinal direction of the display portion 3 has a size almost double that of the main body portion 2 in the longitudinal direction.

More specifically, the support body 34 has a size covering from the side surface on the connection section 4 side in one main surface (in other words, one surface of the information input surface 2a and the rear surface 2b) of the main body portion 2, through the side surface on the opposite side from the connection section 4 in a plan view, to another main surface of the main body portion 2. In other words, the first support portion 34A and the second support portion 34B have substantially the same size as each main surface of the main body portion 2 in a plan view.

In the flexible device 1, the flexible display 31 can be bent (rotated) by 360 degrees around the center axis 35 of the curved portion 34C by bending the display portion 3 in the curved portion 34C.

Although not illustrated, in the flexible device 1, the second display region 31B in the flexible display 31 is freely rotatable between a state of contacting the first display region 31A in portions other than the curved portion 34C, and a state of contacting the first support portion 34A in portions other than the curved portion 34C.

Therefore, in FIG. 4A, a state is illustrated as an example in which the display portion 3 is bent so as to be wound around the main body portion 2 with the main body portion 2 therebetween such that the flexible display 31 contacts with each main surface (in other words, an information input surface 2a and a rear surface 2b) of the main body portion 2, with the support body 34 as the outside. However, the present embodiment is not limited to this.

As illustrated in FIGS. 9A and 9B described later, the curved portion 34C is freely rotatable between a state where adjacent portions with the center axis 35 of the curved portion 34C therebetween in the display portion 3 bend so as to be wound around the main body portion 2 with the main body portion 2 therebetween such that the support body 34 contacts with each main surface of the main body portion 2 with the flexible display 31 as the outside, and a state where the adjacent portions bend so as to be wound around the main body portion 2 with the main body portion 2 therebetween such that the flexible display 31 contacts with each main surface of the main body portion 2 with the support body 34 as the outside.

In other words, in the flexible device 1, the display portion 3 is bent in the curve portion 34C so that the second display region 31B can be rotated by 360 degrees with respect to the first display region 31A via a state of being deployed by 180 degrees.

The display portion 3 is connected with the main body portion 2 by the flexible connection section 4. As illustrated in FIG. 3 and FIGS. 4A and 4B, the connection section 4 is a flexible hinge including a flexible printed circuits (FPC) substrate 41 including a wiring line for supplying various signals or the like from the main body portion 2 to the flexible display 31. The FPC board 41 has, for example, a configuration in which a circuit pattern is formed on a flexible and thin base film. A covering layer 42 that covers at least circuit patterns exposed to the outside, and has flexibility is formed on the surface of the FPC board 41. The FPC board 41 is electrically connected to the mounting substrate 23 in the inside of the main body portion 2 and the drive circuit of the flexible display 31, and supplies various signals or the like from the main body portion 2 to the flexible display 31.

As illustrated in FIGS. 2A and 2B to FIGS. 4A and 4B, the connection section 4 is drawn from one side surface of the main body portion 2 to the outside. Specifically, the connection section 4 is coupled to the main body portion 2 in the center portion of a thickness direction in one side surface of the main body portion 2. The connection section 4 is formed to be freely rotatable on the information input surface 2a side of the main body portion 2 and the rear surface 2b side. In other words, in the flexible device 1, one of the main body portion 2 and the display portion 3 can be bent (rotated) by 360 degrees with respect to the other, with the connection section 4 as a rotation axis.

Here, the fact that one of the main body portion 2 and the display portion 3 can be bent by 360 degrees with respect to the other refers to that the flexible device 1 is freely rotatable between a state where a portion (specifically, the covering member 33 in the first support portion 34A (in other words, the first covering portion 33A)) adjacent to the main body portion 2 via the connection section 4 in the display portion 3 contacts with the information input surface 2a as one main surface of the main body portion 2, and a state where a portion (specifically, the first display region 31A of the flexible display 31) adjacent to the main body portion 2 via the connection section 4 contacts with the rear surface 2b as another main surface of the main body portion 2.

In other words, in the flexible device 1, the display portion 3 can be rotated by 360 degrees with respect to the main body portion 2 via a state of being deployed by 180 degrees by bending the connection section 4.

The bending degree (curvature) of the connection section 4 is not limited particularly. However, the flexible device 1 according to the present embodiment is an ultra-thin information processing device, and when the thickness of the main body portion 2 is, for example, 4 mm as described above, the curvature radius of the connection section 4 when the display portion 3 is wound around the main body portion 2 by bending the connection section 4 drawn from the center portion in the thickness direction in one side surface of the main body portion 2 is set to, for example, 1 mm.

In the present embodiment, as an example, the thickness of the display portion 3 is 1.5 mm, and when the thickness of the main body portion 2 is 4 mm as described above, the thickness of the flexible device 1 when the flexible device 1 is folded as illustrated in FIGS. 4A and 4B, for example, is set to 7 mm. However, the specific numerical values described above are merely examples, and the present embodiment is not limited to the above descriptions.

As described above, in the flexible device 1, the display portion 3 can be freely bent in each of the connection section 4 and the curved portion 34C. Therefore, the flexible device 1 can be variously modified as illustrated in FIGS. 2A and 2B to FIGS. 8A and 8B, and can be used in different styles by one device.

Examples of Usage Mode

Here, examples of usage mode of the flexible device 1 will be described.

Figure 5A:
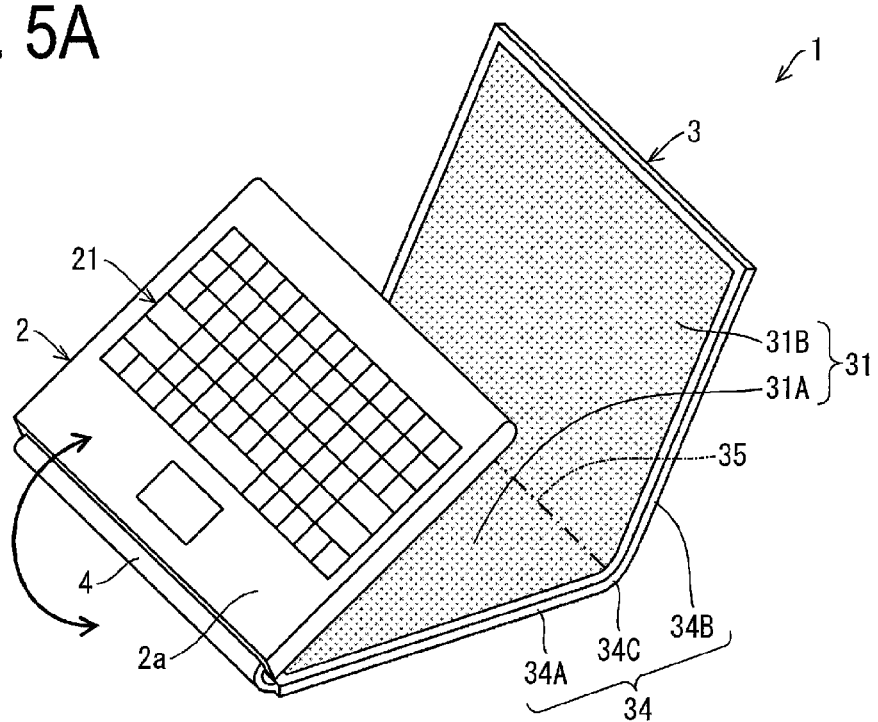
FIG. 5A is a perspective view illustrating a state in a middle of bending the body portion such that the flexible device according to the first embodiment of the disclosure is switched between a notebook style and a seamless dual-screen style.
Figure 5B:
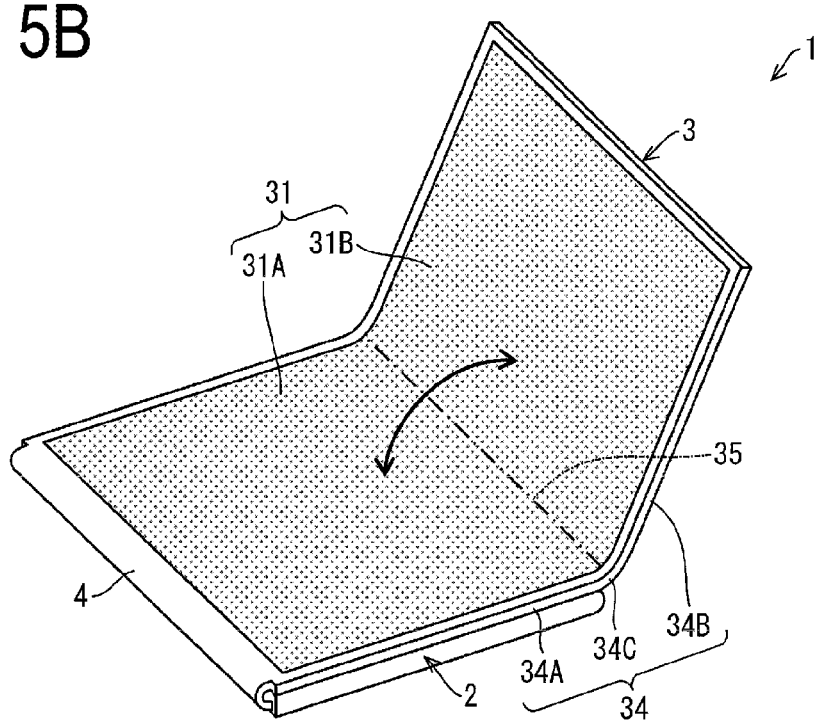
FIG. 5B is a perspective view illustrating a state in a middle of switching the flexible device according to the first embodiment of the disclosure from the seamless dual-screen style to a large screen tablet style.
Figure 6A:
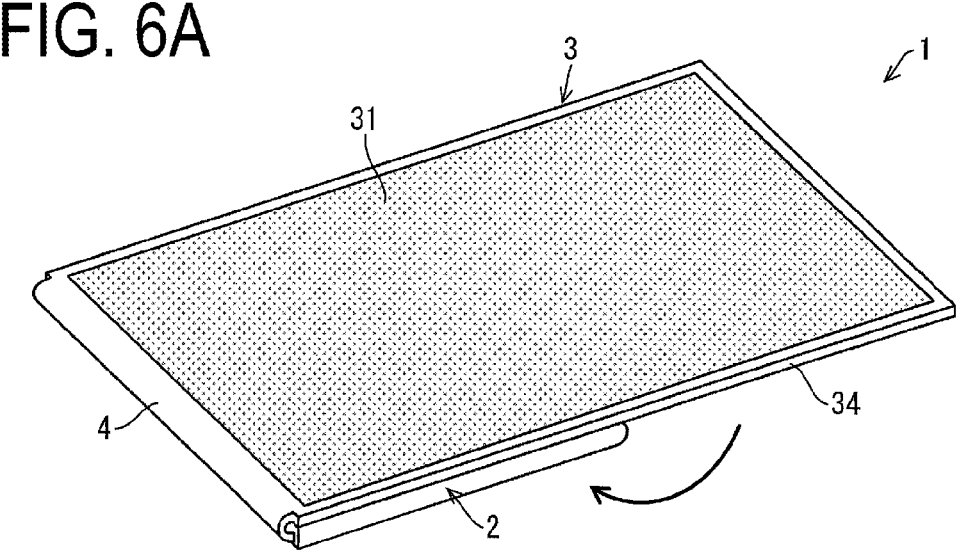
FIG. 6A is a perspective view illustrating appearance of the flexible device according to the first embodiment of the disclosure in the large screen tablet style.
Figure 6B:
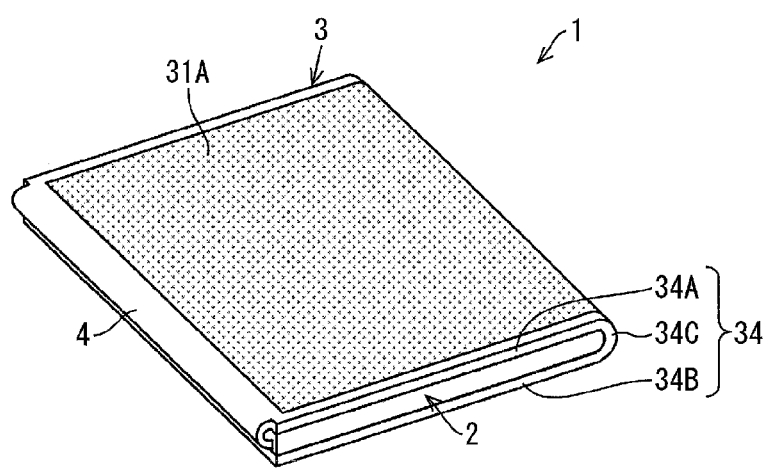
FIG. 6B is a perspective view illustrating appearance of the flexible device according to the first embodiment of the disclosure in a small screen tablet style.
Figure 7A:
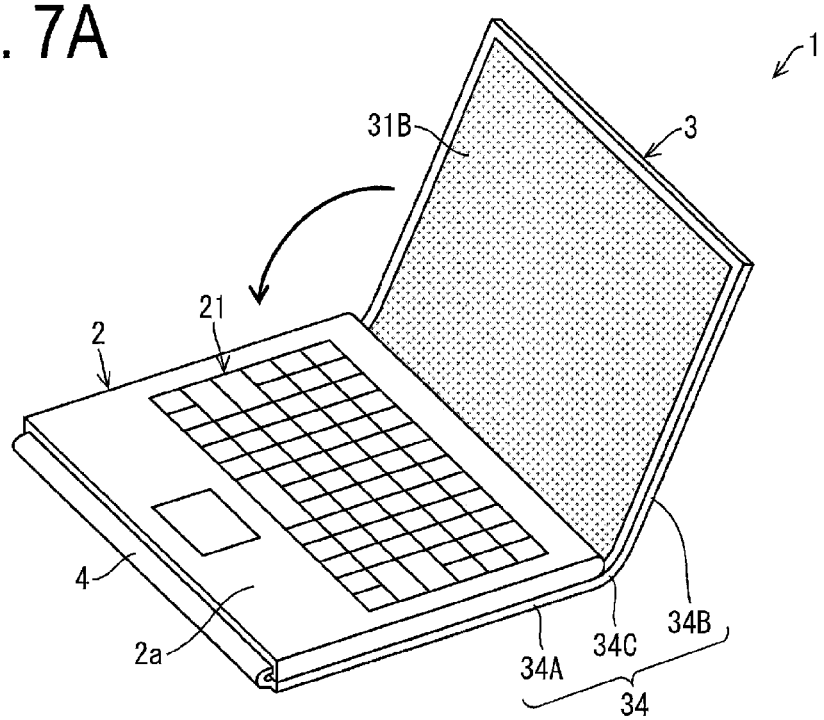
FIG. 7A is a perspective view illustrating appearance of the flexible device according to the first embodiment of the disclosure in the notebook style.
Figure 7B:
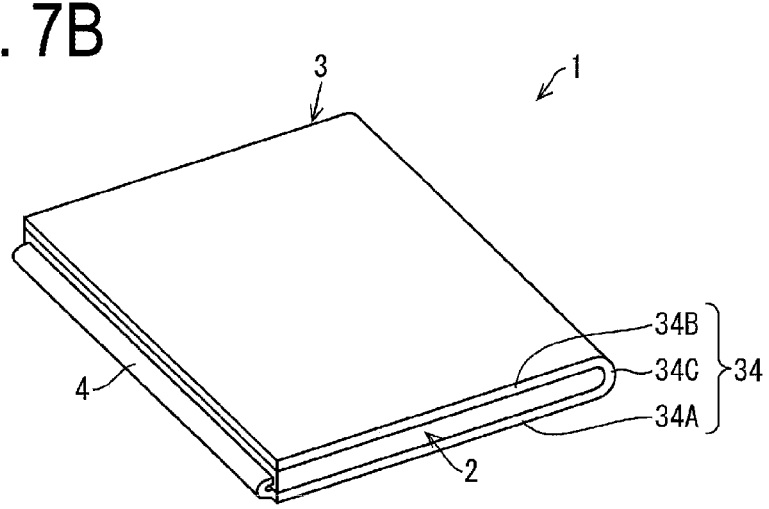
FIG. 7B is a perspective view illustrating appearance of the flexible device according to the first embodiment of the disclosure in an accommodation style.
Figure 8A:
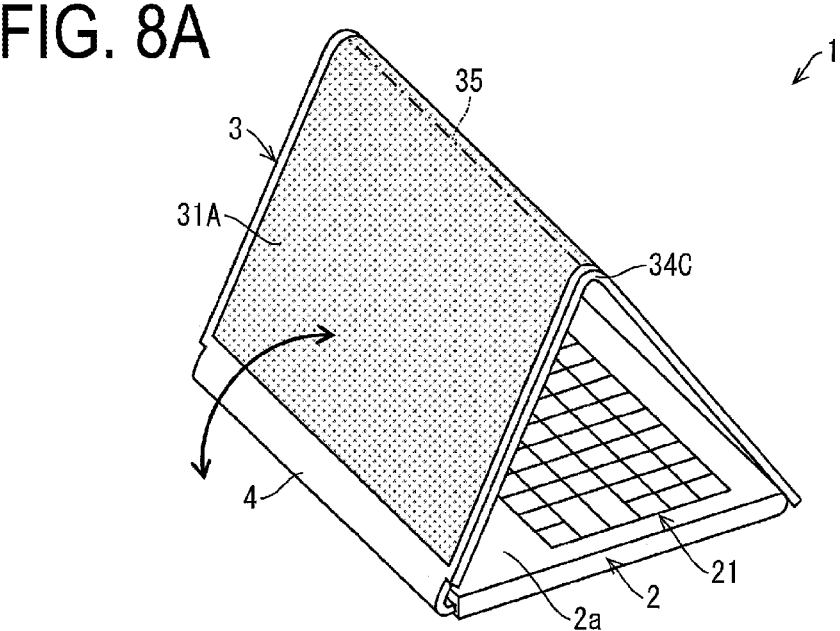
FIGS. 8A and 8B are perspective views illustrating appearance of the flexible device according to the first embodiment of the disclosure in a presentation style viewed from different angles.
Figure 8B:
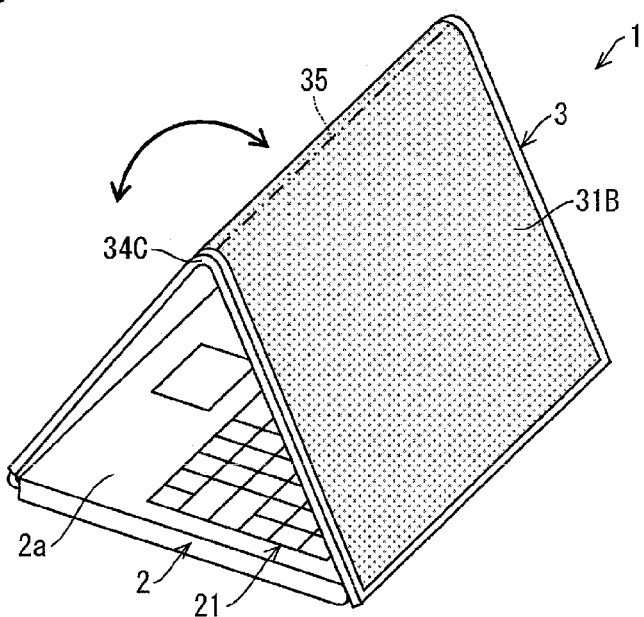

FIG. 5A is a perspective view illustrating a state in a middle of bending the body portion 2 such that the flexible device 1 is switched between a notebook style and a seamless dual-screen style, and FIG. 5B is a perspective view illustrating a state in a middle of switching the flexible device 1 from the seamless dual-screen style to a large screen tablet style. FIG. 6A is a perspective view illustrating appearance of the flexible device 1 in the large screen tablet style, and FIG. 6B is a perspective view illustrating appearance of the flexible device 1 in a small screen tablet style. FIG. 7A is a perspective view illustrating appearance of the flexible device 1 in the notebook style, and FIG. 7B is a perspective view illustrating appearance of the flexible device 1 in an accommodation style. FIG. 8A and FIG. 8B are perspective views illustrating appearance of the flexible device 1 in a presentation style viewed from different angles.

Here, the notebook style is a usage mode in which, as illustrated in FIG. 5A and FIG. 7A, the connection section 4 is bent such that the main body portion 2 is located on the flexible display 31 so that the main body portion 2 is bent to the upper surface side of the display portion 3 with the information input surface 2a as the upper surface side.

In the notebook style, as illustrated in FIG. 7A, the main body portion 2 is rotated around the connection section 4 such that the rear surface 2b of the main body portion 2 contacts with the first display region 31A of the flexible display 31, and the second support portion 34B is fixed in a state of being bent at an arbitrary angle with respect to the first support portion 34A.

As a result, in the notebook style, the information input portion 21 such as a key input operation portion such as a keyboard, or a pad portion can be used, and the flexible device 1 is used as a notebook type information processing device with the second display region 31B in the flexible display 31 as a display screen.

The seamless dual-screen style is used in a usage mode in which, from the state illustrated in FIG. 5A, the main body portion 2 is folded to the opposite side from the flexible display 31 in the display portion 3 such that the information input surface 2a contacts with the first support portion 34A, and in this state, as illustrated in FIG. 5B, the display portion 3 is used by being bent or expanded within a range in which the first display region 31A and the second display region 31B are viewed as a one visible region.

In other words, in the seamless dual-screen style, flexible device 1 is used by fixing the first support portion 34A and the second support portion 34B at an arbitrary angle with the first display region 31A and the second display region 31B as one display screen.

In the seamless dual-screen style, when the flexible display 31 has a touch panel function, information input by contact with the flexible display 31 is performed. In the seamless dual-screen style, for example, the flexible device 1 can be used as a notebook type information processing device, with the first display region 31A as the information input portion 21, and the second display region 31B as a display screen.

In the seamless dual-screen style, the large screen tablet style is particularly a usage mode in which the display portion 3 is deployed by 180 degrees such that the display portion 3 is made full-flat state as illustrated in FIG. 6A.

In other words, the large screen tablet style is a state where the second support portion 34B is rotated such that the first display region 31A and the second display region 31B are made flush in a state where the main body portion 2 is folded to the opposite side from the flexible display 31 as illustrated in FIG. 5B.

The small tablet style is a usage mode in which, from the state illustrated in FIG. 6A, as illustrated in FIG. 6B, the display portion 3 is folded with the main body portion 2 therebetween such that the flexible display 31 faces the outside, the flexible display 31 is located in each of front and rear surfaces of the flexible device 1, and screen display is performed in substantially half the large screen tablet style in the same plane.

In other words, in the small tablet style, in a state where the main body portion 2 is folded to the opposite side from the flexible display 31 in the display portion 3 as illustrated in FIG. 5B, via the state where the display portion 3 is deployed by 180 degrees as illustrated in FIG. 6A, the second support portion 34B is rotated such that the second support portion 34B contacts with the rear surface 2b of the main body portion 2 so that the display portion 3 is bent so as to be wound around the main body portion 2 with the flexible display 31 as the outside. As a result, the main body portion 2 is in a state of being sandwiched in the inside of the display portion 3 with the flexible display 31 as the outside.

The presentation style is a usage mode in which, as illustrated in FIGS. 8A and 8B, the main body portion 2 is arranged in a bottom portion with the information input surface 2a as an upper surface side, and the display portion 3 is folded in a convex shape in a state where the support body 34 faces the inside and the flexible display 31 faces the outside such that the display portion 3 covers the upper portion of the main body portion 2, so that the flexible device 1 is a triangular prismatic shape in which there is no bottom surface and one side surface is laid horizontally.

In other words, the presentation style is a state where, from the state illustrated in FIG. 5B or FIG. 6A, the display portion 3 is bent such that an end portion opposite from the connection section 4 in a plan view in the support body 34 is located in an end portion opposite from the connection section 4 in a plan view in the main body portion 2.

For example, one of the end portions opposite from the connection section 4 in a plan view in the support body 34, and the end portion opposite from the connection section 4 in a plan view in the main body portion 2 may be provided with a recessed portion not illustrated, and the other may be provided with a protruding portion not illustrated to be fit to the recessed portion, and as a result, the main body portion 2 and the display portion 3 may be fixed.

In the presentation style, the flexible device 1 is used as a double display in which the first display region 31A and the second display region 31B are separately viewed by separate users facing with the flexible device 1 therebetween.

The accommodation style is a state where, from the notebook style illustrated in FIG. 7A, as illustrated in FIG. 7B, the display portion 3 is folded such that the second display region 31B of the flexible display 31 contacts with the information input surface 2a of the main body portion 2. As illustrated in FIG. 7B, in the accommodation style, the display portion 3 is bent so as to be wound around the main body portion 2 with the flexible display 31 as the inside. As a result, the main body portion 2 is in a state of being sandwiched in the inside of the display portion 3 with the support body 34 as the outside.

The flexible device 1 includes a sensor not illustrated for determining whether the main body portion 2 and the display portion 3 are bent, and the display mode in the first display region 31A and the second display region 31B are switched such that the display mode corresponds to the usage mode on the basis of the determination result by the sensor.

In the small tablet style, display may be performed only on one of the first display region 31A and the second display region 31B, or may be performed on both of the display regions, and the display regions (display screens) used for display may be switched by using a touch panel function.

Advantageous Effects

Next, advantageous effects by the shape of the curved portion 34C of the support body 34 used as the bent portion in the flexible device 1 according to the present embodiment will be described with comparison with a case where a flexible device of a comparative example illustrated in FIGS. 10A and 10B and FIGS. 11A and 11B.

In FIGS. 10A and 10B and FIGS. 11A and 11B, for convenience of description, a constituent element having the function as that of a constituent element illustrated in FIGS. 1A and 1B and FIGS. 9A and 9B is added with the same reference numeral and description thereof is omitted.

FIG. 9A is a partially broken cross-sectional view illustrating a schematic configuration of the flexible device 1 according to an embodiment of the disclosure in the vicinity of the curved portion 34C in a state where the flexible device 1 is folded with the flexible display 31 being inside and the display portion 3 wound around the main body portion 2, and FIG. 9B is a partially broken cross-sectional view illustrating a schematic configuration of the flexible device 1 according to an embodiment of the disclosure in the vicinity of the curved portion 34C in a state where the flexible device 31 is folded with the flexible display 31 being outside and the display portion 3 wound around the main body.

More specifically, FIG. 9A is a partially broken cross-sectional view illustrating a schematic configuration of the flexible device 1 illustrated in FIG. 4A in the vicinity of the curved portion 34C, and FIGS. 4A and 4B and FIG. 9A are cross-sectional view of the flexible device 1 in the accommodation style. FIG. 9B is a cross-sectional view of the flexible device 1 in the small tablet style illustrated in FIG. 6B.

Figure 10A:
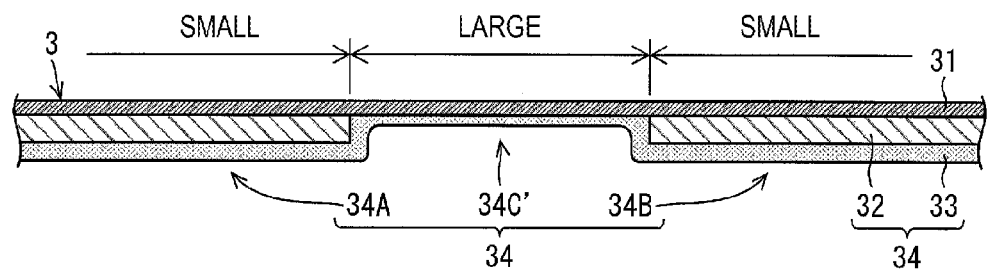
FIG. 10A is a cross-sectional view illustrating a shape of a bent portion of a support body in a flexible device of a comparative example.
Figure 10B:
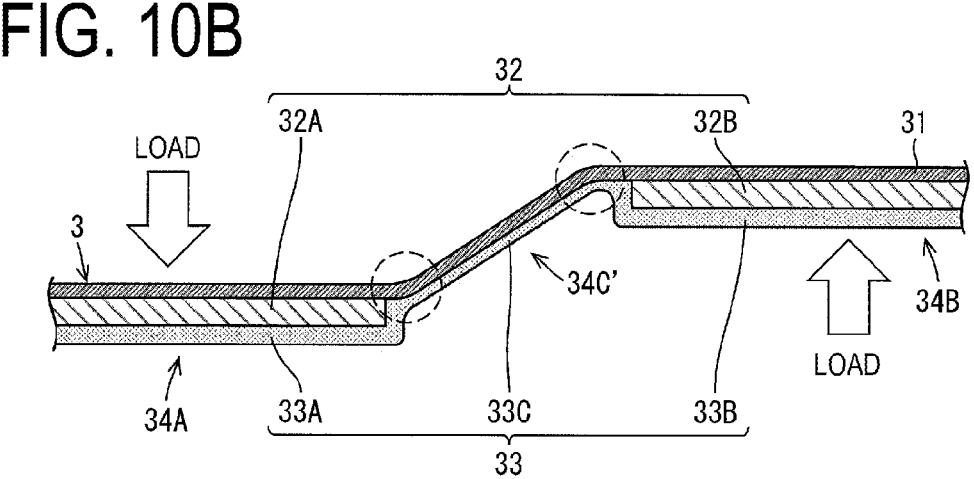
FIG. 10B is a cross-sectional view illustrating a state where a load is applied to a bent portion illustrated in FIG. 10A.

FIG. 10A is a cross-sectional view illustrating a shape of a bent portion 34C' of a support body 34 in the flexible device of the comparative example, and FIG. 10B is a cross-sectional view illustrating a state where a load is applied to the bent portion 34 C' illustrated in FIG. 10A.

Figure 11A:
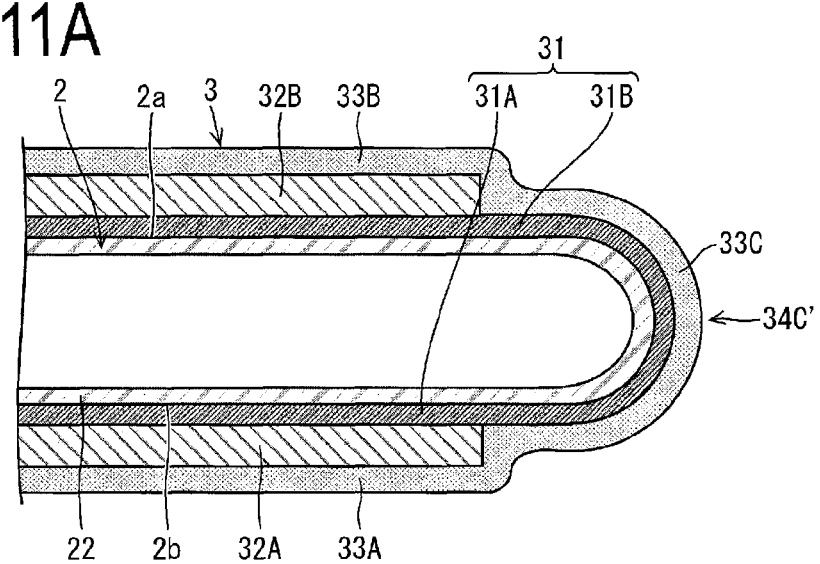
FIG. 11A is a partially broken cross-sectional view illustrating a schematic configuration of the flexible device of the comparative example in the vicinity of the bent portion in a state where the flexible device is folded with the flexible display being inside and the display portion wound around a main body.
Figure 11B:
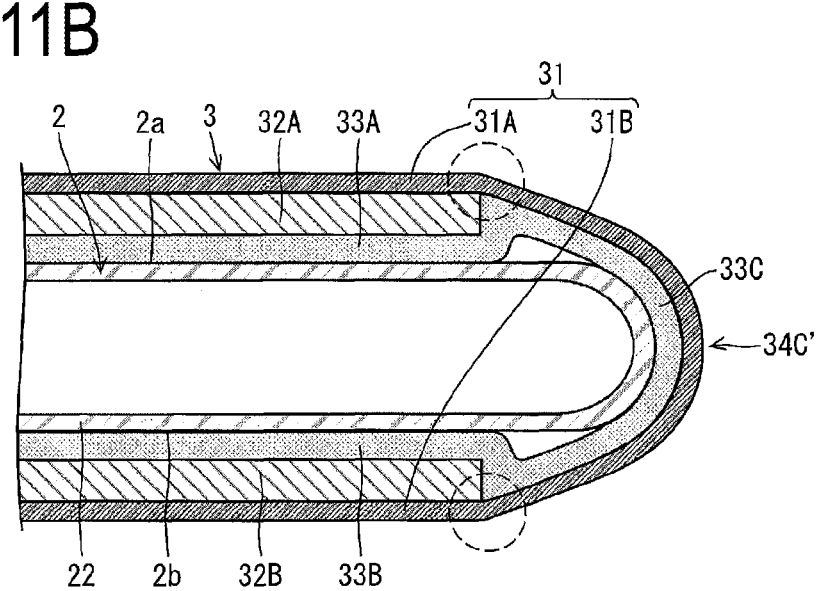
FIG. 11B is a partially broken cross-sectional view illustrating a schematic configuration of the flexible device of the comparative example in the vicinity of the bent portion in a state where the flexible device is folded with the flexible display being outside and the display portion wound around the main body.

FIG. 11A is a partially broken cross-sectional view illustrating a schematic configuration of the flexible device of the comparative example in the vicinity of the bent portion 34C' in a state where the flexible device is folded with the flexible display 31 being inside and the display portion 3 wound around a main body portion 2, and FIG. 11B is a partially broken cross-sectional view illustrating a schematic configuration of the flexible device of the comparative example in the vicinity of the bent portion 34C' in a state where the flexible device is folded with the flexible display 31 being outside and the display portion 3 wound around the main body portion 2.

In the flexible device of the comparative example illustrated in FIGS. 10A and 10B and FIGS. 11A and 11B a core material 32 includes a first core portion 32A and a second core portion 32B separated from each other, as similar to the flexible device 1 illustrated in FIGS. 1A and 1B. However, the first core portion 32A and the second core portion 32B are plate shape having a substantially even thickness, and a covering member 33 that covers the first core portion 32A and the second core portion 32B also has a substantially even thickness.

As a result, in the flexible device of the comparative example, the bent portion 34C' is different from the curved portion 34C (bent portion) of the flexible device 1 according to the present embodiment, and an inner wall surface is a recessed shape having no curved shape. In other words, the flexible device of the comparative example has a recessed portion in which facing wall surfaces are vertically erected in the recessed portion as the bent portion 34C'.

As illustrated in FIG. 10A, when the inner wall surface is a recessed shape having no curved shape, and the support body 34 is not arc shape and straight thin shape in the bent portion 34C', in other words, when the bottom wall of the recessed portion included in the bent portion 34C' is a planer face having a substantially even thickness, if a load is applied to the first support portion 34A and the second support portion 34B in different directions as illustrated in FIG. 10B, as illustrated in a portion surrounded by a broken line in FIG. 10B, the thickness of the support body 34 becomes thin, a stress concentrates on a boundary portion between the portion where the covering member 33 directly contacts with the flexible display 31, and the portion where the covering member 33 contacts with the core material 32, and the display portion 3 is bent at the boundary portion in a folded-line shape.

Particularly, as illustrated in FIGS. 10A and 10B, when the thickness of the core material 32 suddenly changes in the bent portion 34C', the thickness of the support body 34 also suddenly changes in the bent portion 34C'. In this case, when a load is applied to the first support portion 34A and the second support portion 34B in different directions as illustrated in FIG. 10B, a large load is applied to a contact portion between each facing side edge portion of the first core portion 32A and the second core portion 32B and the flexible display 31, each facing side edge portion being a start end of the first core portion 32A and the second core portion 32B in the bent portion 34C'. As a result, a crease is generated in the flexible display 31 and the flexible display 31 is bent, or the flexible display 31 is ripped.

Even when the inner wall surface of the recessed portion included in the bent portion 34C' has a tapered shape, in a case of a straight tapered shape, when a load is applied to the first support portion 34A and the second support portion 34B in different directions, as similar to the case where a taper is not formed in the inner wall, a stress concentrates on the boundary portion between the portion where the covering member 33 directly contacts with the flexible display 31, and the portion where the covering member 33 contacts with the core material 32, and the display portion 3 is bent at the boundary portion in a folded-line shape.

On the other hand, according to the present embodiment, as illustrated in FIGS. 1A and 1B, since the curved portion 34C used as the bent portion is a curved shape having an oval arc-shaped cross section that is gently curved, even when a load is applied to the first support portion 34A and the second support portion 34B in different directions as illustrated in FIG. 1B, a load is not applied to one position, and stress can be dispersed, so that a crease is not generated in the flexible display 3 and the flexible display 3 is not ripped.

In addition, the curved portion 34C has a curved surface forming the oval arc-shaped cross section and having the curvature described above, and the stress is dispersed, so that the display portion 3 is bent smoothly in the curved portion 34C and in a fine arc shape.

Particularly, in the present embodiment, as described above, the connection section 4 and the curved portion 34C are provided to be freely bendable (rotatable) so that the display portion 3 can be bent with the main body portion 2 therebetween such that the display portion 3 is wound around the plate-shaped main body portion 2 having rigidity as illustrated in FIGS. 9A and 9B such that the flexible display 31 is bent at a gentle bending angle.

For example, in the accommodation style and the small tablet style as described above, the flexible device 1 according to the present embodiment is bent along the surface of the main body portion 2 around the main body portion 2 so as to be wound around the plate-shaped main body portion 2 having rigidity as illustrated in FIGS. 9A and 9B. At this time, in the flexible device 1 according to the present embodiment, the flexible display 31 is bent in an arc shape with the thickness of the main body portion 2, or the thickness obtained by adding the thickness of the support body 34 (in the example illustrated in FIG. 9B, the thickness of the covering member 33) to the thickness of the main body portion 2, as the curvature radius.

Particularly, as illustrated in FIG. 9B, the covering member 33 is formed to be fill a gap between the main body portion 2 and the core material 32, and the flexible display 31 in the curved portion 34C when the display portion 3 is bent so as to be wound around the main body portion 2 with the flexible display 31 as an outside, so that a load applied to the flexible display 31 when the display portion 3 is bent as illustrated in FIG. 9B can be reduced.

On the other hand, in a case of the flexible device of a comparative example in which the inner wall surface has a recessed shape having no curved shape, as illustrated in FIGS. 11A and 11B, a load is applied to the support body 34 in each end portion of the first core portion 32A and the second core portion 32B in the curved portion 34C' with the support body 34 not bent in an arc shape.

As a result, in the flexible device of the comparative example, the support body 34 may be damaged, and as illustrated in FIG. 11B, when the display portion 3 is wound around the main body portion 2 with the flexible display 31 as the outside, the flexible display 31 is drawn at a corner portion of each end portion of the first core portion 32A and the second core portion 32B in the bent portion 34C', and a crease is generated in the flexible display 31 as illustrated in the portion surrounded by a broken line in FIG. 11B. However, the flexible device 1 according to the present embodiment does not have such a problem.

As described above, according to the present embodiment, the curved portion 34C that includes a surface opposite from the laid surface of the flexible display 31, the surface being gently curved toward the laid surface of the flexible display 31, and that has an oval arc-shaped cross section, in the support body 34, is provided as a bent portion of the support body 34, so that the flexible device 1 having a simple configuration capable of reducing a load in the curved portion 34C used as a bent portion and preventing the flexible display 31 from being damaged can be provided.

Manufacturing Method for Flexible Display 1

A manufacturing method for the flexible display 1 will be described next referring to FIG. 3.

The support body 34 in the flexible device 1 can be formed by insert molding the core material 32 to the covering member 33, or double molding the covering member 33 and the core material 32.

In the present embodiment, for example, the display portion 3 is formed by insert molding the core material 32 and the flexible display 31 to the covering member 33.

When the core material 32 and the flexible display 31 are insert molded to the covering member 33, as a core material forming process, first, the core material 32 is formed by cutting a manufactured flat plate.

On the other hand, as a flexible display forming process, the flexible display 31 is manufactured by, for example, forming the drive circuit, the electro-optic element, or the like on a support body such as a glass substrate via a peeling layer such as a heat absorption layer, sealing with a sealing film, and then, peeling the peeling layer and the support body to form a protection film.

Next, as a flexible display laying process, the flexible display 31 and the core material 32 are set in a mold for insert molding. After that, as a covering member molding process, a resin as a material of the covering member 33 is injected to the mold, the covering member 33, the core material 32, and the flexible display 31 are integrated.

As a result, the support body 34 is formed including at least one curved portion 34C that includes a surface opposite from the laid surface of the flexible display 31, the surface being gently curved, and that has an oval arc-shaped cross section, and the display portion 3 is formed in which the flexible display 31 is laid across the curved portion 34C in the laid surface of the flexible display 31 in the support body 34 (in other words, the surface opposite from the surface formed with the curved surface of the curved portion 34C in the support body 34).

When the covering member 33 and the core material 32 are double molded, first, the flexible display 31 is manufactured as similar to the above.

After that, the flexible display 31 is set in a common mold used for double molding, mold closing of fitting the common mold and a primary mold is performed, and a resin as a material of the core material 32 is injected to the primary mold, so that the core material 32 is molded. As a result, the flexible display 31 is insert molded to the core material 32, and the core material 32 that is rigid is primarily molded first.

Next, the mold is opened, and mold closing of fitting the common mold and a secondary mold is performed, a resin as a material of the covering member 33 is injected to the secondary mold to form the covering member 33, and the covering member 33, the core material 32, and the flexible display 31 are integrated.

As a result, the support body 34 is formed including at least one curved portion 34C that includes a surface opposite from the laid surface of the flexible display 31, the surface being gently curved, and that has an oval arc-shaped cross section, and the display portion 3 is formed in which the flexible display 31 is laid across the curved portion in the laid surface of the flexible display 31 in the support body 34.

In this way, the core material 32 and the flexible display 31 are insert molded to the covering member 33, or the flexible display 31 is set to the mold for double molding to double mold the core material 32 and the covering member 33, so that the display portion 3 is formed in which the covering member 33, the core material 32, and the flexible display 31 are stacked not via an adhesive layer (integrally molded) (display portion forming process).

Next, the mounting substrate 23 in the inside of the main portion 2 and the connection terminal section in the drive circuit of the flexible display 31 are connected with the FPC board 41, and the surface of the connection terminal section and the FPC board 41 is covered with the covering layer 42 so as to be protected, so that the main body portion 2 and the display portion 3 are connected with each other (connection process). As a result, the flexible device 1 is manufactured.

The covering member 33, the core material 32, and the flexible display 31 are integrated by insert molding or double molding, so that the flexible device 1 not requiring an adhesive, excellent in durability and bendability, having a small number of components, and being thinner can be provided.

First Modified Example

In the present embodiment, a case has been described as an example in which the core material 32 has a structure partitioned along the central axis 35 of the curved portion 34, and has end portions at positions separated from the central axis 35.

However, the present embodiment is not limited thereto. The core material 32 may have a recessed shape including a tapered inner wall surface inclined to be thinner toward the central axis 35 of the curved portion 34C (in other words, the bending axis of the bent portion) on the surface opposite from the flexible display 31 in at least the curved portion 34C. In other words, the core material 32 may be made thinner and remained without being removed in the curved portion 34C, and may be provided between the covering member 33 and the flexible display 31 over the entire the display portion 3.

Second Modified Example

In the present embodiment, a case has been described as an example in which the display portion 3 has a size almost double that of the main body portion 2, and in the display portion 3, one curved portion 34C is provided in a center portion of the longitudinal direction of the display portion 3 such that the longitudinal direction is divided into two.

However, the present embodiment is not limited to this, and may have a configuration in which the display portion 3 has a size almost three times that of the main body portion 2 or larger, and a plurality of curved portions 34C are provided in the display portion 3. In other words, it is sufficient that at least one curved portion 34C is provided in the display portion 3.

In other words, in the present embodiment, a case has been described as an example in which the flexible device 1 has the first display region 31A and the second display region 31B, and is used as, for example, a double-display. However, the flexible device 1 may include a third display region not illustrated with the curved portion 34C therebetween, in addition to the first display region 31A and the second display region 31B, and may be used as, for example, a triple-display.

Third Modification

The flexible device 1 may include a stand not illustrated, and depending on the structure of the curved portion 34C, the stand may be used for assisting the first support portion 34A and the second support portion 34B standing alone in a bending state in the seamless dual-screen style and the notebook style, for example. In other words, the second support portion 34B may be fixed to the first support portion 34A at an arbitrary angle with the stand.

The stand may be provided so as to be attachable and removable to be able to be attached or detached by magnetism by embedding a magnet or a magnetic metal for stand adsorption so as to be flush with the covering member 33 on the surface opposite from the flexible display in the support body 34, and using a magnetic metal adsorbed to the magnet for stand adsorption or the magnet for stand adsorption adsorbed to the magnetic metal for stand adsorption or to the magnetic metal, in the contact position with the support body 34 in the stand.

One end of the stand may be fixed rotatably to the surface opposite from the flexible display in the support body 34 so as to have a standing state and falling state. In this case, a recessed portion may be provided along the outer shape of the stand in the surface opposite from the flexible display in the support body 34, and the stand may be embedded in the support body 34 such that the surface of the stand in the falling state is flush with the covering member 33.

Fourth Modification

The present embodiment has been described while exemplifying a case in which a flexible device (electronic device) according to the present embodiment is an information processing device such as a personal computer including a main body portion including a key input operation unit. However, the present embodiment is not limited thereto.

The main body portion 2 may be, for example, a telephone body, a television receiver or the like, a hard disk drive (HDD) recorder, a digital versatile disc recorder (DVD), or a Blu-ray (registered trade mark) recorder, and the flexible device 1 may be an electronic device such as a communication device, an information recording and reproduction device, or an information reproduction device.

Second Embodiment

Another embodiment of the disclosure will be described hereinafter on the basis of FIG. 12. The present embodiment will be stated by the differences between the present embodiment and the first embodiment, and components having the same functions as the components used in the first embodiment are appended with the same reference signs, and the description thereof is omitted.

Schematic Configuration of Flexible Device 1

Figure 12:
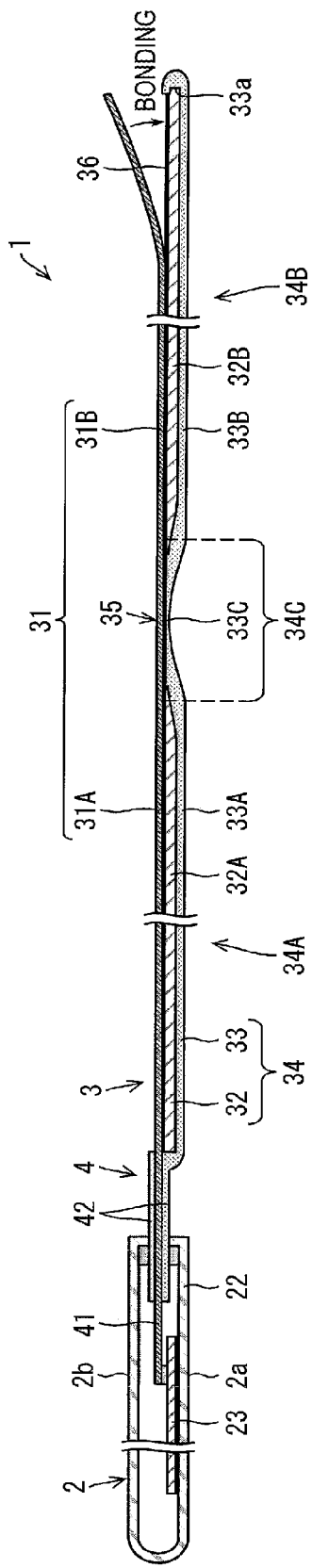
FIG. 12 is a partially broken cross-sectional view illustrating main portions of a flexible device according to a second embodiment of the disclosure in a state where the flexible device is deployed by 180°.

FIG. 12 is a partially broken cross-sectional view illustrating main portions of a flexible device 1 according to the present embodiment in a state where the flexible device 1 is deployed by 180°.

As illustrated in FIG. 12, the flexible device 1 according to the present embodiment is the same as the flexible device 1 according to the first embodiment excluding that an adhesive layer 36 is provided between the support body 34 and the flexible display 31, and the flexible display 31 is laid on the support body 34 via the adhesive layer 36.

Manufacturing Method for Flexible Device 1

In the manufacturing method for the flexible device 1 according to the present embodiment, processes up to the core material forming process, and the flexible display forming process are the same as those in the first embodiment.

Also in the present embodiment, in the flexible display forming process, as similar to the first embodiment, the flexible display 31 is manufactured by, for example, forming the drive circuit, the electro-optic element, or the like on a support body such as a glass substrate via a peeling layer such as a heat absorption layer, sealing with a sealing film, and then, peeling the peeling layer and the support body to form a protection film.

As the flexible display 31 used in the present embodiment, a commercially available flexible display may be used.

Therefore, the manufacturing method for the flexible display 31 is not limited to the method described above.

Also, in the present embodiment, the support body 34 can be formed by insert molding the core material 32 to the covering member 33, or double molding the covering member 33 and the core material 32.

When the core material 32 is insert molded to the covering member 33, as similar to the first embodiment, as a core material forming process, first, the core material 32 is formed by cutting a manufactured flat plate. Next, as a covering member molding process, a resin as a material of the covering member 33 is injected to the mold for insert molding, the covering member 33 and the core material 32 are integrated (support body forming process).

When the covering member 33 and the core material 32 are double molded, as a core material forming process, first, the primary mold for double molding and the common mold are used, and the core material 32 that is rigid is first injection molded. Next, as a covering member molding process, the secondary mold for double molding and the common mold are used to inject mold the covering member 33, so that the covering member 33 and the core material 32 are integrated (support body forming process).

After that, in the present embodiment, the adhesive layer 36 is formed on the laid surface of the flexible display 31 in the support body 34 in which the core material and the covering member 33 are stacked (integrally molded) not via the adhesive layer as described above, and the flexible display 31 is bonded onto the support body 34 via the adhesive layer 36 (flexible display laying process).

As a result, the display portion 3 is formed including the support body 34 in which the covering member 33 and the core material 32 are stacked (integrally molded) not via the adhesive layer, and provided with the adhesive layer 36 between the support body 34 and the flexible display 31 (display portion forming process).

Next, as similar to the first embodiment, the mounting substrate 23 in the inside of the main portion 2 and the connection terminal section in the drive circuit of the flexible display 31 are connected with the FPC board 41, and the surface of the connection terminal section and the FPC board 41 is covered with the covering layer 42 so as to be protected, so that the main body portion 2 and the display portion 3 are connected with each other (connection process). As a result, the flexible device 1 according to the present embodiment is manufactured.

In the above description, a case has been described as an example in which the adhesive layer 36 is formed on the laid surface of the flexible display 31 in the support body 34. However, the present embodiment is not limited to this, and the adhesive layer 36 may be formed on the laid surface to the support body 34 of the flexible display 31, in other words, the surface opposite from the display screen in the flexible display 31.

According to the present embodiment, a commercially available flexible display may be used the flexible display 31. In addition, the mold used for insert molding or double molding can be made simple, and the process can be made simple.

Third Embodiment

A description will be given of yet another embodiment of the disclosure, with reference to FIG. 13. The present embodiment will be stated by the differences between the present embodiment and the first and second embodiments. Components having the same functions as the components stated in the first and second embodiments are appended with the same reference signs, and the description thereof is omitted.

Schematic Configuration of Flexible Device 1

Figure 13:
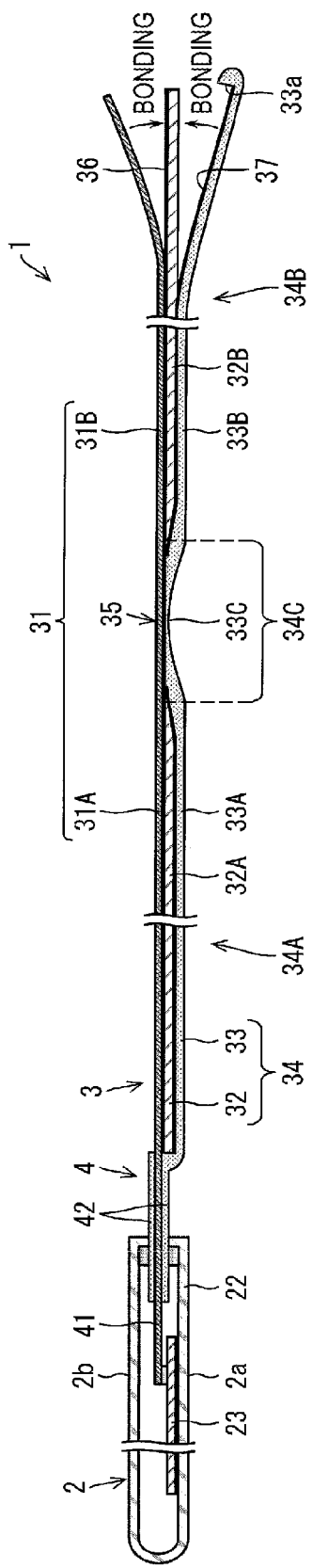
FIG. 13 is a partially broken cross-sectional view illustrating main portions of a flexible device according to a third embodiment of the disclosure in a state where the flexible device is deployed by 180°.

FIG. 13 is a partially broken cross-sectional view illustrating main portions of a flexible device 1 according to the present embodiment in a state where the flexible device 1 is deployed by 180°.

As illustrated in FIG. 13, the flexible device 1 according to the present embodiment is the same as the flexible device 1 according to the second embodiment excluding that an adhesive layer 37 is provided between the covering member 33, and the flexible display 31 in the core material 32 and the curved portion 34C.

The flexible device 1 according to the present embodiment is provided with an adhesive layer 36 between the support body 34 and the flexible display 31, and is provided with the adhesive layer 37 between the covering member 33, and the flexible display 31 in the core material 32 and the curved portion 34C.

Manufacturing Method for Flexible Device 1

The flexible device 1 according to the present embodiment is the same as the flexible device 1 according to the second embodiment excluding that the covering member 33, and the flexible display 31 in the first core portion 32A, the second core portion 32B, and curved portion 34C are bonded with the adhesive layer 37.

In other words, in the present embodiment, for example, the adhesive layer 37 is formed in the covering member 33, and in the core material forming process, the core material 32 is bonded onto the adhesive layer 37, the adhesive layer 36 is formed on the core material 32, the core material 32 and the flexible display 31 are bonded with each other via the adhesive layer 36, and the covering member 33 and the flexible display 31 are bonded with each other via the adhesive layer 37 (flexible display laying process). However, the present embodiment is not limited to the above configuration.

For example, a configuration may be adopted in which, in the core material forming process, the adhesive layer 37 is formed on the contact surface side with the covering member 33 in the first core portion 32A and the second core portion 32B, the first core portion 32A and the second core portion 32B are bonded to the covering member 33 via the adhesive layer 37, and then, in the flexible display laying process, the adhesive layer 36 is be formed on the contact surface with the flexible displayed 31 in the covering member 33 exposed between the first core portion 32A and the second core portion 32B, and the flexible display 31 is bonded to the support body 34 via the adhesive layer 36.

According to the present embodiment, similar to the second embodiment, a commercially available flexible display may be used the flexible display 31. In addition, the mold and equipment used for insert molding is not necessary, and the process can be made simple.

Supplement

The flexible device 1 according to a first aspect of the disclosure includes the display portion 3 including the flexible display 31 and the support body 34 in which the flexible display 31 is laid. The support body 34 includes at least one curved portion 34C that includes a surface opposite from a laid surface of the flexible display 31, the surface being gently curved toward the laid surface of the flexible display 31, and that has an oval arc-shaped cross section. The flexible display 31 is laid across the curved portion 34C.

In the flexible device 1 according to a second aspect of the disclosure, the support body 34 includes the covering member 33 having flexibility, and the core material 32 provided at least in a part between the covering member 33 and the flexible display 31, and the covering member 33 may include, in the curved portion 34C, a curved portion 33C that includes a surface opposite from the laid surface of the flexible display 31, the surface being gently curved toward the laid surface of the flexible display 31, and that has an oval arc-shape.

In the flexible device 1 according to a third aspect of the disclosure, in the second aspect, the core material 32 may have, at least in the curved portion 34C in the support body 34, inclined surfaces 32A1 and 32B1 inclined to the laid surface of the flexible display 31 and formed thinner toward the central axis 35 of the curved portion 34C of the support body 34.

In the flexible device 1 according to a fourth aspect of the disclosure, in the third aspect, the core material 32 may have a structure partitioned along the central axis 35 of the curved portion 34C of the support body 34, and have the first core portion 32A and the second core portion 32B separated from each other with the central axis 35 of the curved portion 34C of the support body 34 therebetween.

The flexible device 1 according to a fifth aspect of the disclosure further includes the plate-shaped main body portion 2, and the connection section 4 that connects the main body portion 2 and the display portion 3 and that is flexible, in which an end portion, in the main body portion 2, opposite from the connection section 4 has a curved shape, the covering member 33 is formed to fill a gap between the main body portion 2 and the core material 32, and the flexible display 31 in the curved portion 34C when the display portion 3 is bent to be wound around the main body portion 2 with the flexible display 31 as an outside.

In the flexible device 1 according to a sixth aspect of the disclosure, in the fifth aspect, a portion adjacent to the main body portion 2 via the connection section 4 in the display portion 3 may be rotatable between a state of contacting one main surface of the main body portion 2, and a state of contacting another main surface of the main body portion 2.

In the flexible device 1 according to a seventh aspect of the disclosure, in the sixth aspect, in the display portion 3, adjacent portions with the center axis 35 of the curved portion 34C therebetween may be freely rotatable between a state of being bent with the main body portion 2 therebetween such that the support body 34 contacts with each main surface (information input surface 2a and rear surface 2b) of the main body portion 2 with the flexible display 31 as an outside, and a state of being bent with the main body portion 2 therebetween such that the flexible display 31 contacts with each main surface of the main body portion 2 with the support body 34 as an outside.

A manufacturing method for the flexible device 1 according to an eighth aspect of the disclosure is a manufacturing method for a flexible device 1 including the display portion 3 including the flexible display 31 and the support body 34 in which the flexible display 31 is laid, the method including forming the support body 34 including at least one curved portion 34C that includes a surface opposite from the laid surface of the flexible display 31, the surface being gently curved, and that has an oval arc-shaped cross section, and laying the flexible display 31 across the curved portion 34C in the laid surface of the flexible display 31 in the support body 34.

In the manufacturing method for the flexible device 1 according to a ninth aspect of the disclosure, in the eighth aspect, the support body 34 may include the covering member 33 having flexibility, and the core material 32 provided at least in a part between the covering member 33 and the flexible display 31, and the method may further include forming the covering member 33 including at least one curved portion 33C that includes a surface opposite from the laid surface of the flexible display 31, the surface being gently curved, and that has an oval arc-shaped cross section, and forming, at least in the curved portion 34C of the support body 34, the core material 32 including the inclined surfaces 32A1 and 32B1 inclined to the laid surface of the flexible display 31 and formed thinner toward the central axis 35 of the curved portion 34C of the support body 34.

In the manufacturing method for the flexible device 1 according to a tenth aspect, in the ninth aspect, the core material 32 and the flexible display 31 may be insert molded to the covering member 3.

In the manufacturing method for the flexible device 1 according to an eleventh aspect of the disclosure, in the ninth aspect, the support body 34 may be formed by insert molding the core material 32 to the covering member 33.

In the manufacturing method for the flexible device 1 according to a twelfth aspect, in the ninth aspect, the core material 32 and the covering member 33 may be double molded to form the support body 34.

In the manufacturing method for the flexible device 1 according to a thirteenth aspect, in the twelfth aspect, after the flexible display 31 is set to a mold for double molding to primary mold the core material 32, the covering member 33 may be secondarily molded.

In the manufacturing method for the flexible device 1 according to a fourteenth aspect, in the eleventh or twelfth aspect, the flexible display 31 may be bonded to the support body 34 via the adhesive layer 36.

In the manufacturing method for the flexible device 1 according to a fifteenth aspect of the disclosure, in the ninth aspect, the core material 32 may be bonded to the covering member 33 via the adhesive layer 37 to form the support body 34, and the flexible display 31 may be bonded to the support body 34 via the adhesive layer (adhesive layer 36 or adhesive layers 36, 37).

The disclosure is not limited to each of the embodiments stated above, and various modifications may be implemented within a range not departing from the scope of the claims. Embodiments obtained by appropriately combining technical approaches stated in each of the different embodiments also fall within the scope of the technology of the disclosure. Moreover, novel technical features may be formed by combining the technical approaches stated in each of the embodiments.

REFERENCE SIGNS LIST

1 Flexible device
2 Main body portion
2a Information input surface
2b Rear surface
3 Display portion
4 Connection section
21 Information input portion
22 Housing
23 Mounting substrate
31 Flexible display
31A First display region
31B Second display region
32 Core material
32A First core portion
32B Second core portion 32A1, 32B1 Inclined surface
33 Covering member
33A First covering portion
33B Second covering portion
33C Curved portion (curved portion of covering member)
33a Recessed portion
34 Support body
34A First support portion
34B Second support portion
34C Curved portion (curved portion of support body)
35 Central axis (central axis of curved portion)
36, 37 Adhesive layer
41 FPC board
42 Covering layer

The invention claimed is:

1. A flexible device comprising:
a display portion including a flexible display and a support body in which the flexible display is laid, wherein
the support body is provided on a side opposite from a display surface of the flexible display,
the support body includes at least one curved portion that includes a surface opposite from a laid surface of the flexible display, the surface being gently curved toward the laid surface of the flexible display, and that has an oval arc-shaped cross section,
the flexible display is laid across the curved portion,
the support body includes a covering member having flexibility, and a core material provided in a portion between the covering member and the flexible display,
the core material includes a structure partitioned along a central axis of the curved portion of the support body, and includes a first core portion and a second core portion separated from each other with the central axis of the curved portion of the support body between the first core portion and the second core portion,
each of the first core portion and the second core portion includes, at least in the curved portion in the support body, an inclined surface inclined to the laid surface of the flexible display and defined to be thinner toward the central axis of the curved portion of the support body,
the covering member covers: (i) surfaces of the first core portion and the second core portion, the surfaces being opposite from the laid surface of the flexible display, and (ii) an exposed portion of a surface of the flexible display, the surface being opposite from the display surface of the flexible display, and the exposed portion not being covered with the first core portion and the second core portion, and
the covering member includes, in the curved portion, a curved portion that includes a surface opposite from the laid surface of the flexible display, the surface being curved toward the laid surface of the flexible display and that has an oval arc-shape so that portions covering the exposed portion are defined to be thinner toward the central axis of the curved portion of the support body.

2. The flexible device according to claim 1 further comprising:
a main body portion that is plate-shaped; and
a connection section that is flexible and that connects the main body portion and the display portion,
wherein an end portion, in the main body portion, opposite from the connection section has a curved shape, and
the covering member fills a gap between the main body portion and the core material, and the flexible display in the curved portion when the display portion is bent to be wound around the main body portion with the flexible display as an outside in a state in which the display portion covers an upper surface and a lower surface of the main body portion.

3. The flexible device according to claim 2, wherein a portion adjacent to the main body portion via the connection section in the display portion is rotatable between a state of contacting one main surface of the main body portion, and a state of contacting another main surface of the main body portion.

4. The flexible device according to claim 3, wherein, in the display portion, adjacent portions with the center axis of the curved portion interposed between the adjacent portions are freely rotatable between a state of being bent with the main body portion therebetween such that the support body contacts with each main surface of the main body portion with the flexible display as an outside, and a state of being bent with the main body portion therebetween such that the flexible display contacts with each main surface of the main body portion with the support body as an outside.

5. A manufacturing method for a flexible device including a display portion including a flexible display and a support body in which the flexible display is laid, the method comprising:
forming a support body including at least one curved portion that includes a surface opposite from a laid surface of the flexible display, the surface being gently curved, and that has an oval arc-shaped cross section; and
laying the flexible display across the curved portion in the laid surface of the flexible display in the support body, wherein
the support body includes a covering member having flexibility, and a core material provided in a portion between the covering member and the flexible display,
the core material includes a structure partitioned along a central axis of the curved portion of the support body and includes a first core portion and a second core portion separated from each other with the central axis of the curved portion of the support body between the first core portion and the second core portion,
each of the first core portion and the second core portion includes, at least in the curved portion in the support body, an inclined surface inclined to the laid surface of the flexible display and defined to be thinner toward the central axis of the curved portion of the support body,
the covering member covers: (i) surfaces of the first core portion and the second core portion, the surfaces being opposite from the laid surface of the flexible display, and (ii) an exposed portion of a surface of the flexible display, the surface being opposite from the display surface of the flexible display, and the exposed portion being not covered with the first core portion and the second core portion,
the covering member includes, in the curved portion, a curved portion that includes a surface opposite from the laid surface of the flexible display, the surface being curved toward the laid surface of the flexible display, and that has an oval arc-shape so that portions covering the exposed portion are defined to be thinner toward the central axis of the curved portion of the support body, and
the step of forming the support body includes forming the core material and forming the covering member.

6. The manufacturing method for a flexible device according to claim 5, wherein the core material and the flexible display are insert molded to the covering member.

7. The manufacturing method for a flexible device according to claim 5, wherein the support body is formed by insert molding the core material to the covering member.

8. The manufacturing method for a flexible device according to claim 5, wherein the core material and the covering member are double molded to form the support body.

9. The manufacturing method for a flexible device according to claim 7, wherein the flexible display is bonded to the support body via an adhesive layer.

10. The manufacturing method for a flexible device according to claim 5, wherein
   the core material is bonded to the covering member via an adhesive layer to form the support portion, and
   the flexible display is bonded to the support body via an adhesive layer.

11. The flexible device according to claim 1, further comprising:
   a main body portion that is plate-shaped, wherein
   the main body portion includes an information input surface, and
   the main body portion and the display portion are connected such that the information input surface of the main body portion and the display surface of the flexible display face opposite directions from each other in a state where the flexible device is deployed by 180 degrees.

12. The manufacturing method for a flexible device according to claim 5, wherein
   the flexible device further includes a main body portion that is plate-shaped, and
   the main body portion includes an information input surface,
   the method further including connecting the main body portion and the display portion such that the information input surface of the main body portion and the display surface of the flexible display face opposite directions from each other in a state where the flexible device is deployed by 180 degrees.

* * * * *